United States Patent [19]
Wolfe et al.

[11] 3,834,010
[45] Sept. 10, 1974

[54] METHOD FOR FORMING WELDED SEAM CAN BODIES

[76] Inventors: Robert W. Wolfe, 49 W. 92nd St., Oak Lawn, Ill. 60453; Richard E. Carlson, 8726 S. Albany, Evergreen Park, Ill. 60642

[22] Filed: Sept. 19, 1972

[21] Appl. No.: 290,325

[52] U.S. Cl. ............... 29/477.7, 29/478, 219/59, 219/64, 228/15
[51] Int. Cl. ............................................ B23k 31/02
[58] Field of Search ............ 29/477, 477.7, 478; 228/15; 219/59, 64, 61

[56] References Cited
UNITED STATES PATENTS

| | | | |
|---|---|---|---|
| 1,062,641 | 5/1913 | Einfeldt | 29/477 |
| 1,550,157 | 8/1925 | Gillette | 29/477 X |
| 1,649,922 | 11/1927 | Paull | 29/477 X |
| 3,171,942 | 3/1965 | Kohler | 219/59 |
| 3,431,383 | 3/1969 | Ullery, Jr. et al. | 219/59 |

*Primary Examiner*—Richard B. Lazarus
*Attorney, Agent, or Firm*—Diller, Brown, Ramik & Wight

[57] ABSTRACT

This disclosure relates to apparatus for forming can bodies one-at-a-time with a welded seam. The apparatus eliminates the prior need for preliminary tack welding and relies upon a simple set of guides for bringing the edges to be welded into the necessary overlapped relation then progressively decreasing the overlap while welding whereby a cylindrical can body may be welded notwithstanding the tendency of can bodies to assume a tapered configuration when welded without prior restraint.

12 Claims, 18 Drawing Figures

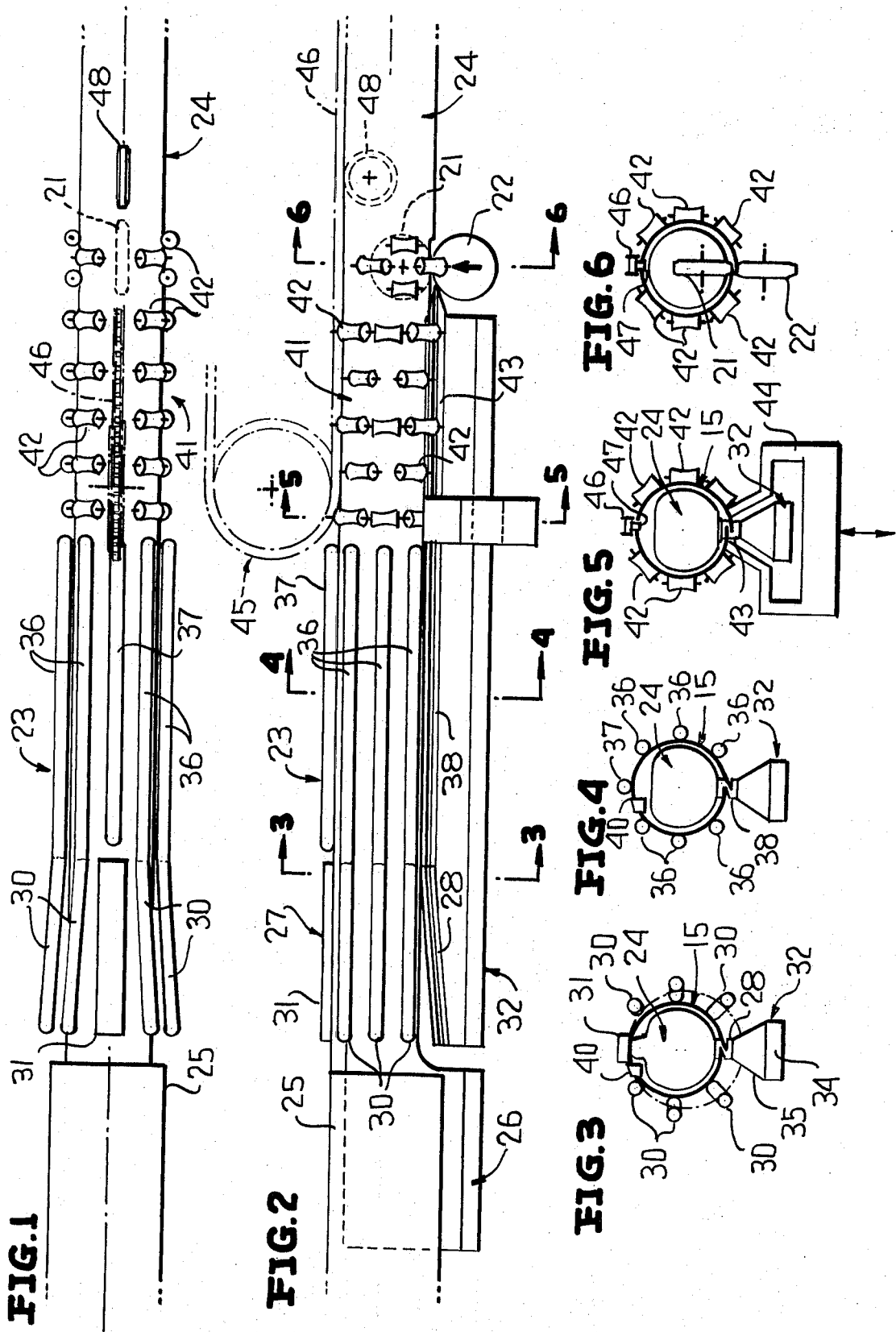

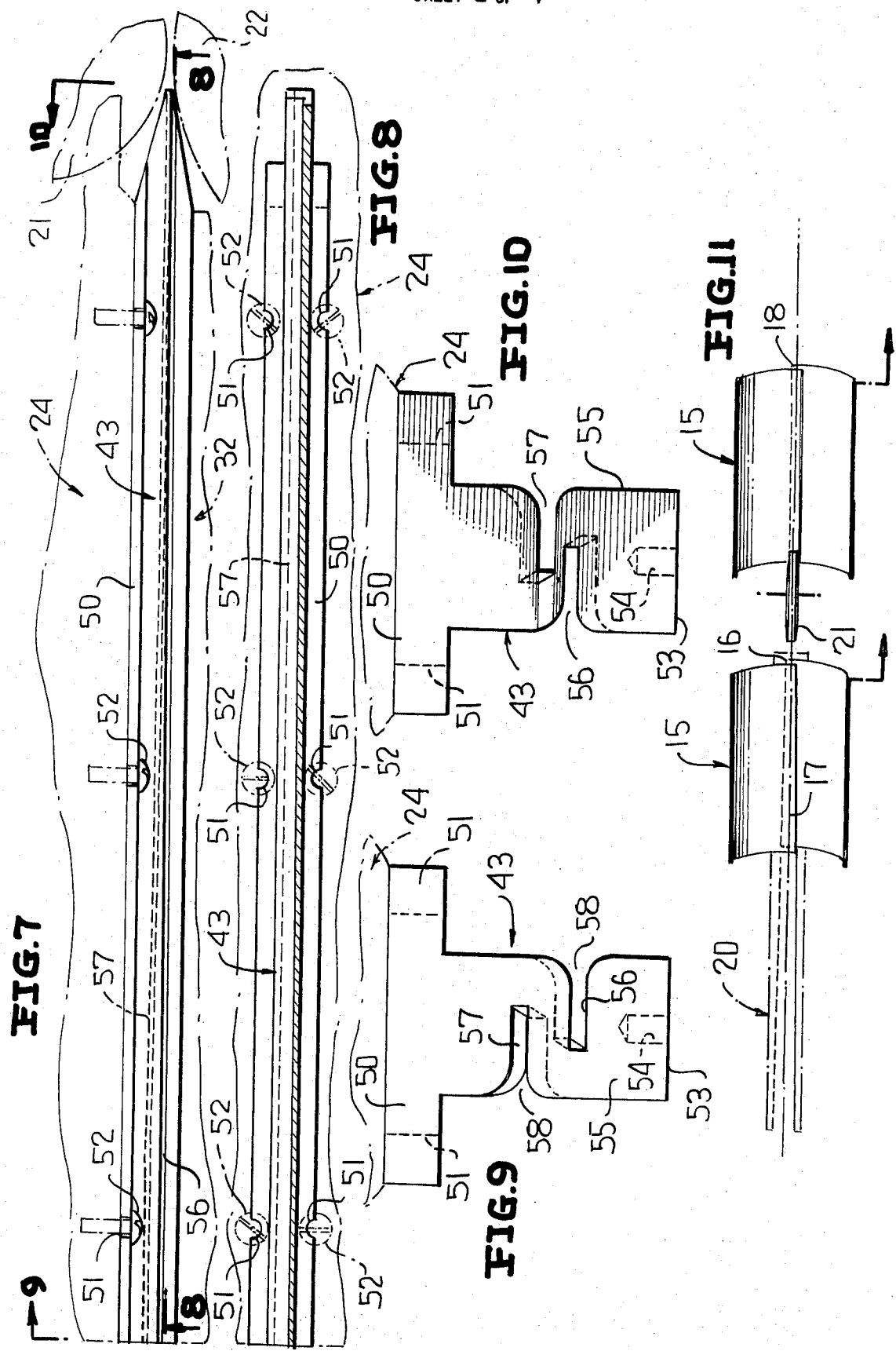

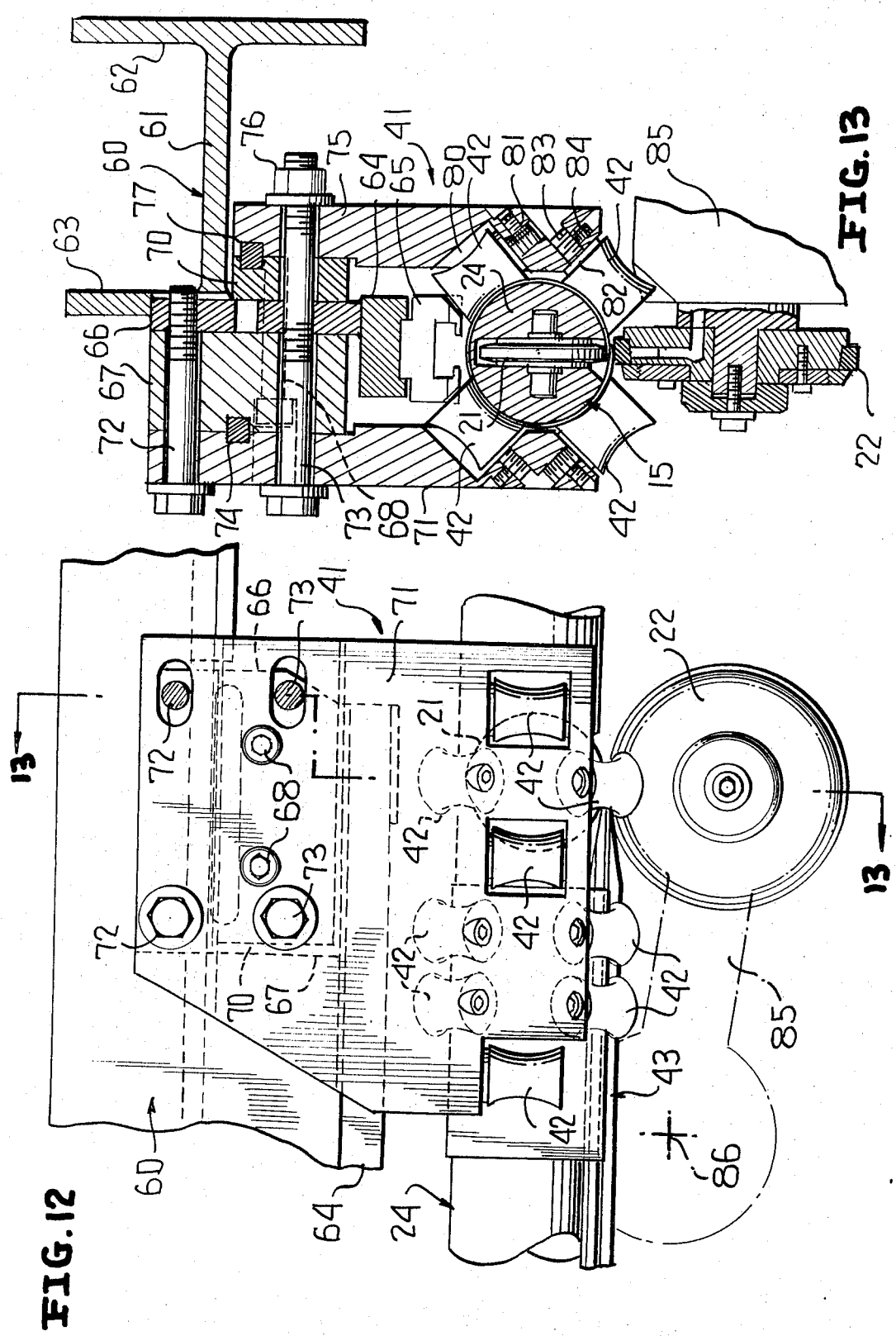

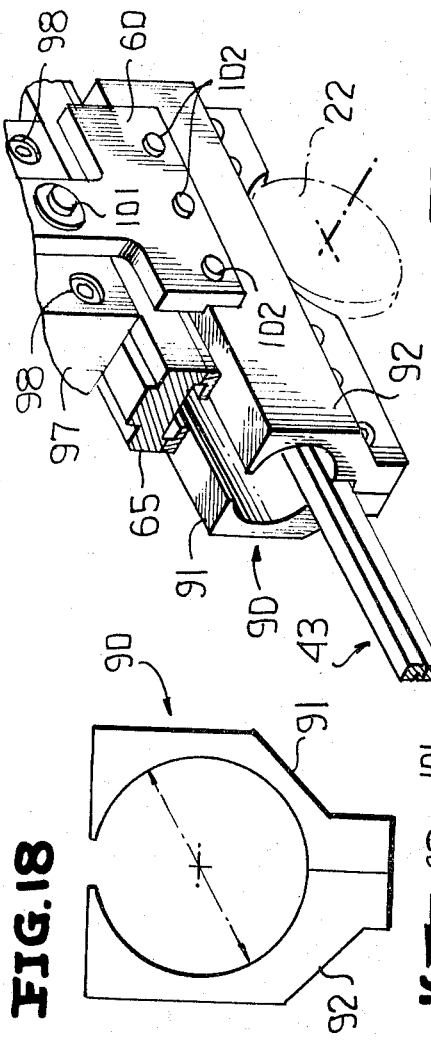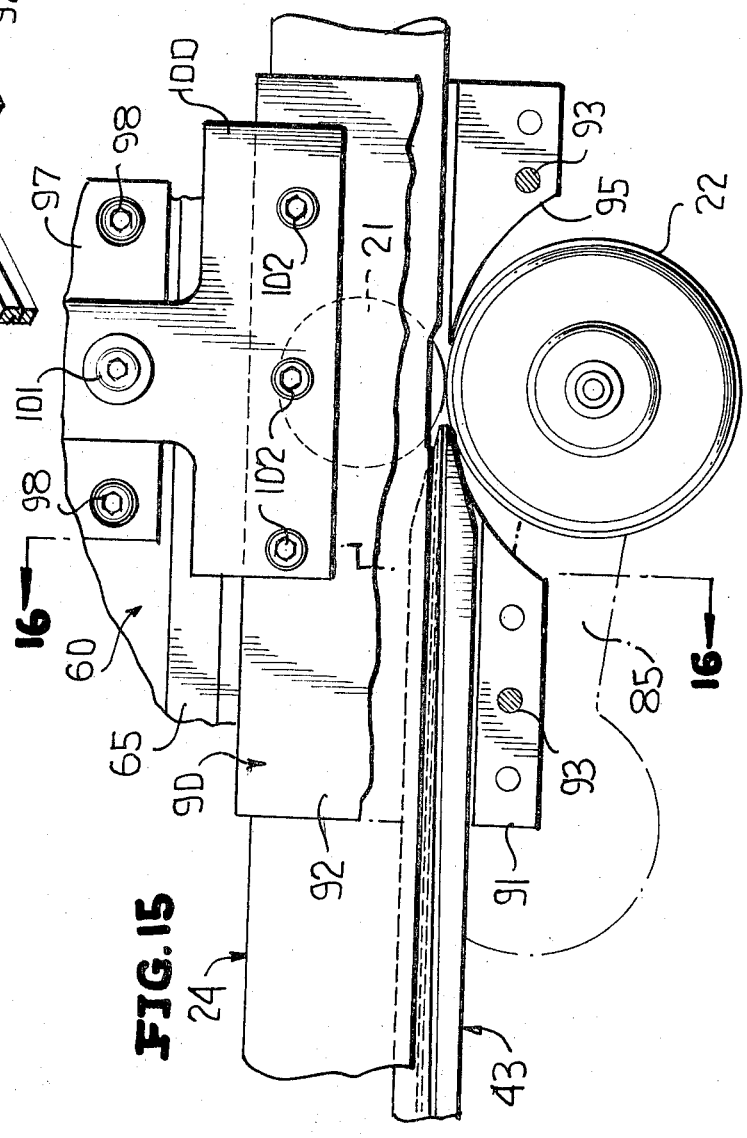

METHOD FOR FORMING WELDED SEAM CAN BODIES

This invention relates in general to new and useful improvements in the manufacture of can bodies, and more particularly to a method of and apparatus for forming welded seamed can bodies.

BACKGROUND OF THE INVENTION

For many years can bodies were provided with side seams of the interlocked and soldered type. This necessitated the forming of the can bodies of tinplated metal. Over the years many attempts were made to form can bodies commercially with welded side seams. While limited quantities of can bodies having welded side seams were produced by a continuous tube welding method, only recently has it become commercially feasible to provide can bodies, particularly those utilized in beverage cans, with welded side seams.

The can bodies which are now formed with welded side seams and produced one at a time are made by forming the can body to a cylindrical form with edges in overlapping relation and while so held in such cylindrical form, the overlapping edges are tack welded. The can body thereafter is fed between a pair of roller electrodes and a continuous welded seam between the overlapped edges is formed.

Such a mode of forming welded seam can bodies has several deficiencies.

First of all, the apparatus requires that the cylindrical configuration of the can body be maintained at a fixed point along the body forming apparatus for undesirable period of time while the tack welds are being formed. This, of course, reduces the over-all speed of the bodymaker even though relatively high rates have been obtainable with present welded seam bodymakers.

Secondly, although a continuous seam is welded over the tack welds, a dimple appears where each tack weld is formed with the result that the appearance of such tack welded and thereafter continuously welded side seam can bodies have an appearance not meeting with the present high standards of containers.

SUMMARY OF THE INVENTION

In accordance with this invention, it has been found that can bodies may be formed one-at-a-time with welded side seams without the prior tack welding thereof in a manner which eliminates the above-outlined deficiencies.

In the past, it has been found that if a can body is shaped to a cylindrical form with edge portions to be welded overlapped, and thereafter the overlapped edges are passed progressively between a pair of roller electrodes in a conventional electrical resistance heating operation, the can body will progressively increase in diameter from the leading edge thereof to the trailing edge with the overlap progressively decreasing. This can be attributed to two factors. First of all, in the welding of the can body, the metal is heated to a relatively high temperature with the result that although only a very narrow width of the metal is so heated, there is an expansion of the metal causing an increase in the circumference of the can body at the point of weld. Furthermore, although the weld is not of the socalled "mash seam" type, there is always a reduction in thickness of the seam from a double thickness with the result that the circumference of the can body is increased by this minute reduction in thickness of the lap seamed portions. Since the welding is progressive, the increase in circumference is a progressive one thereby causing the taper in the can body.

Although in the past Z-bars have been utilized in edge guidance with respect to the welding of continuous tube, it had been thought that in conjunction with one-at-a-time can body welding, a Z-bar could not effectively control the overlapped edge portions to produce a cylindrical can body. In accordance with this invention, however, it has been found that this is possible.

Basically, this invention relates to the guidance of the overlapped edge portions of a can body prior to and during the welding thereof. It has been found that if the can body, at the time welding occurs, has the overlap at the trailing edge thereof greater than the overlap at the leading edge, as the welding proceeds in a normal manner, the overlap will decrease and if the overlap is correctly controlled and allowed to progressively decrease correctly, the net result will be a cylindrical can body.

A principal feature of the invention, in view of the foregoing, is the provision of a guiding apparatus for can bodies which may be rapidly formed from a blank into an unseamed cylindrical form, after which opposed edge portions of the formed body are progressively brought into overlapping relation with the overlap being greater than that desired in the final can body, and thereafter progressively decreasing the overlap as the can body advances to a welding area.

Another feature of this invention is the utilization of a Z-bar not only for the edge guidance of can bodies to be welded, but also as a support for the horn along which can bodies pass. In the past, such horns have been supported at one end only and thereafter have been supported only by cooperating internal and external rolls between which can bodies pass. Through the use of a Z-bar guide, the horn may be supported immediately adjacent the weld area without in any way interferring with the movement of can bodies along the horn.

It has been found that if the unseamed can bodies are shaped to a generally oval configuration in advance of the welding point with the major axis of the oval passing through the overlapped edges of the can bodies, and thereafter the cross section of the can bodies gradually changes to a circular cross section, the desired edge guidance in association with the Z-bar may be more readily obtained. It has also been found that it is desirable to maintain control over the can bodies slightly beyond the welding point even though the Z-bar does terminate slightly in advance of the welding point.

In accordance with the foregoing, a further feature of this invention is the provision of a rigid guide sleeve which is notched at one end for the reception of the Z-bar and which rigid guide sleeve extends beyond the welding point with the guide sleeve having a suitable opening therein for the reception of the external roller electrode at the welding area, the guide sleeve having the necessary internal configuration so as to first shape the can bodies to a generally oval cross section and then gradually re-form the can bodies to a cylindrical cross section.

With the above and other objects in view that will hereinafter appear, the nature of the invention will be

IN THE DRAWINGS:

FIG. 1 is a plan view of a schematic showing of a can body maker in accordance with this invention.

FIG. 2 is a side elevational view of the body-maker and shows further details thereof.

FIG. 3 is a transverse vertical sectional view taken along the line 3—3 of FIG. 2 and shows the cross section of a can body as it passes from a first Z-bar guide.

FIG. 4 is a transverse sectional view taken along the line 4—4 of FIG. 2 and shows the configuration of the can body as it passes along a next Z-bar guide.

FIG. 5 is a transverse vertical sectional view taken along the line 5—5 of FIG. 2 and shows the configuration of the can body as it proceeds along a final Z-bar guide.

FIG. 6 is a transverse vertical sectional view taken along the line 5—5 of FIG. 2 and shows the can body as it appears at the welding station.

FIG. 7 is an enlarged side elevational view of the final Z-bar showing the manner in which it is utilized as a support for the horn and the tapered configuration thereof to provide clearance with respect to the two roller electrodes.

FIG. 8 is a horizontal sectional view taken along the line 8—8 of FIG. 7 and shows further the details of the Z-bar including the securement thereof to the horn.

FIG. 9 is an enlarged transverse vertical sectional view taken along the line 9—9 of FIG. 7 and shows the cross section of the entrance end of the Z-bar.

FIG. 10 is an enlarged fragmentary vertical sectional view taken along the line 10—10 of FIG. 7 and shows the configuration of the Z-bar at the exit end thereof.

FIG. 11 is a schematic showing of the manner in which the edge portions of a can body are overlapped as they are progressively fed between the roller electrodes and further shows the cylindrical configuration of a welded seam can body, upper portions of the can body being broken away for purposes of clarity.

FIG. 12 is an enlarged side elevational view of the apparatus of FIG. 1 in the area of welding and shows specifically constructional details of the apparatus.

FIG. 13 is a transverse vertical sectional view taken along the line 13—13 of FIG. 12 and shows further the details of the apparatus.

FIG. 14 is a perspective view of a modified external guide at the welding area and shows generally the details thereof.

FIG. 15 is an enlarged side elevational view of the guide structure of FIG. 14 and shows further the details thereof, a portion of the guide sleeve being broken away.

FIG. 16 is a vertical sectional view taken along the line 16—16 of FIG. 15 and shows the relationship of the guide sleeve with respect to the horn and Z-bar.

FIG. 17 is a schematic elevational view of the entrance end of the guide sleeve and shows the cross section thereof.

FIG. 18 is a schematic end view of the guide sleeve at the exit end thereof.

Referring now to the drawings in detail, reference is first made to FIG. 11 wherein the principles of the invention are illustrated. It has been found that if immediately in advance of a welding area a can body 15 is not of a cylindrical configuration, but decreases in circumference from its leading end to its trailing end, when the overlapped edges 16, 17 are welded together by a conventional electrical resistance welding process, the tendency of the circumference of the can body to grow during welding will compensate for the initial taper of the can body with the result that a cylindrical can body with a welded side seam 18 will result. This invention relates to these principles and the apparatus for carrying out the same. In a practical application of the invention, the overlapped edges are guided by means of a Z-bar 20 which has only been schematically illustrated, and a pair of cooperating roller electrodes 21, 22 of which only the upper roller electrode 21 has been illustrated in FIG. 11.

Reference is now made to FIGS. 1 through 6 wherein the details of the can forming apparatus, more specifically identified as a bodymaker and generally identified by the numeral 23, are shown. The bodymaker 23 includes an elongated horn 24 along which can bodies are moved in guided and supported relation. It is to be understood that the left end of the horn 24 is to be fixedly supported in any conventional manner against movement. A left end portion 25 of the horn 24 is cylindrical and is cooperable with any conventional forming apparatus for forming an unseamed can body in place on the horn 24. Preferably the forming of a body blank into a can body is accomplished by a roll forming operation. The cylindrical portion includes a support 26 which facilitates the supporting of the horn 24 remote from the left end thereof.

Adjacent to and downstream of the cylindrical roll forming horn portion 25, the bodymaker includes guide apparatus generally identified by the numeral 27. The guide apparatus 27 includes a Z-bar 28 which is oriented for receiving the unseamed and opposing edges of a newly formed can body and cooperates with a plurality of guide rods 30 which are spaced peripherally about the horn 24 and converge left to right, as is best shown in FIG. 1. It is to be noted that the guides also include an uppermost guide 31 which extends parallel to the horn and cooperates therewith in the manner shown in FIG. 3 to maintain the central part of a can body generally circumferentially fixed relative to the horn 24 while the guide rods 30, in cooperation with the Z-bar 28, reduce the diameter of the unseamed can body and guide the opposed edges thereof into overlapped relation.

At this time it is also pointed out that the Z-bar 28 is carried by one end of an elongated support 32 which is of the same cross section as the support 26 of the cylindrical roll form horn portion 25. It is to be noted that the supports 26 and 32 each include a base portion 34 and an upwardly tapering upper portion 35 which is symmetrical about a vertical plane. The taper of the support portion 35 provides for the gradual upward movement of the free edges of the unseamed can body as the diameter thereof is progressively reduced until entry of the edges into the slots of the Z-bar 28 is assured.

It will also be readily apparent from FIGS. 2 and 3 that the Z-bar 28, in conjunction with the guide rods 30 and 31 function to assure the progressive movement of the free edges of the can body into overlapped relation with the overlap generally being greater than the final overlap in the resultant seam of the can body.

Referring now to FIGS. 2 and 4, it will be seen that the guide rods 30 include extensions 36, which may be integrally formed therewith and which extend parallel to the axis of the horn 24. Also, an upper guide rod 37, which is in alignment with the guide rod 31, is provided. The guide rods 36 and 37, in conjunction with an intermediate Z-bar 38 solely to guide an unseamed can body into a cylindrical configuration as it moves along the horn 24 with the edges of the unseamed can body in overlapped relation, as is clearly shown in FIG. 4. The intermediate Z-bar is carried by the support 32 in any desired manner.

It is to be understood that the can bodies are advanced from the roll forming station to a position beyond the guide rods 36 and 37 and the Z-bar 38 by a reciprocating feed dog 40. It is also to be understood that there may be more than one feed dog so that this initial movement of the can bodies is a step-by-step movement.

It is also to be understood that the relationship of the various guide rods and the Z-bars 28 and 38 is such that the forming and guiding of the can bodies by the guide rods is resisted by the resiliency of the metal of the can body and that the Z-bars 28 and 38 have little function except to maintain the radial spacing of the overlapped edges and the circumferential orientation thereof. In other words, the edges of the can bodies, which have a tendency to be sharp, are normally not in pressure contact with the Z-bars 28 and 38 and there is no wear problem involved.

The cylindrically formed can bodies pass from the influence of the guide rods 36 and 37 under the influence of a further guide assembly 41 which includes a plurality of hour glass rolls 42 which are provided in numbers and positions to maintain complete control over a can body as the overlapped edges 16, 17 thereof are welded by being passed between the roller electrodes 21, 22. Cooperating with the guide assembly 41 is a final Z-bar guide 43 which is also carried by the support 32. The specific configuration of the Z-bar 43 is the most critical configuration and will be described in more detail hereinafter. It is to be understood that the combined efforts of the guide assembly 41 and the Z-bar 43 is one wherein the can body becomes of a slightly conical configuration with the overlap of the edge portions 16, 17 gradually decreasing, as is shown in FIG. 11. It is to be understood, however, that this decrease in overlap is relatively minor. The decrease in overlap may vary with the circumference of the can body being formed, the thickness of the metal thereof, the length of the can body and the specific characteristics of the metal from which the can body is formed. Therefore, no attempt is made here to specifically define the amount of overlap or the decrease therein.

At the time the can bodies pass into the guide assembly 41 and the Z-bar 43, it is necessary to make certain that the ends of the can bodies are square. Accordingly, a squaring device 44 is provided. The squaring device 44, which is schematically illustrated in FIGS. 2 and 5, may be of any type and is illustrated as being one which is reciprocated into and out of the path of can bodies for engaging the can bodies on opposite sides of the unseamed portions thereof and for temporarily stopping the advance of the can bodies thereby effecting the squaring operation. It is to be understood, however, that any type of squaring device may be utilized.

It is also to be noted that the can bodies are advanced through the guide assembly 41 and the Z-bars 43, as well as between the roller electrodes 21, 22 by means of an endless chain type conveyor, generally identified by the numeral 45. The conveyor 45 may be of any conventional construction and is in the form of a chain 46 having feed dogs 47 spaced therealong, as is shown in FIGS. 5 and 6. After the can bodies have the seams thereof welded by means of the roller electrodes 21, 22, they will be continued to be moved along the horn 24 to other work stations (not shown) by the endless chain conveyor 45.

It is also to be noted at this time that the horn 24 is fully supported up to a point adjacent the roller electrodes 21, 22. This is accomplished by the Z-bars 38 and 43, which are fixedly secured to the support 32 and are secured to the underside of the horn 24. Therefore, flexing of the horn, which has been a problem in the past, is eliminated. It is to be understood that this flexing occurs because the roller electrode 21 is carried by the horn, with the horn functioning as bus bar therefor, and the roller electrode 22 is constantly urged into pressure engagement with the can body being welded in opposition to the roller electrode 21.

If desired, the horn 24 may be provided with suitable back-up rolls 48 in the upper portion thereof downstream of the roller electrode 21. Such back-up rolls 48 would cooperate with other rolls (not shown) disposed above the horn 24 for backing up the horn 24 against the upward prssure exerted thereon by the roller electrode 22 through the roller electrode 21.

Reference is now made to FIGS. 7 through 10 wherein an illustration of a practical terminal Z-bar 43 is shown. Referring first to FIGS. 9 and 10, it will be that the Z-bar 43 is of a T-shaped cross section and includes an upper mounting flange 50 which is provided at spaced intervals in the remote edges thereof with fastener receiving openings through which fasteners 52 (FIG. 7) pass with the fasteners 52 being threaded into the horn 24 and securing the Z-bar 43 to the underside of the horn 24. A lower face 53 of the Z-bar 43 is intended to seat on the support 32 in the previously described manner so as to be supported thereby. The Z-bar 43 may be releaseably secured to the support 32 in any desired manner including by way of fasteners (not shown) extending upwardly through the support 32 and engaged in threaded bores 54 in the lower portion of the Z-bar 43.

The Z-bar 43 also includes a vertically extending stem portion 55 which has formed in the opposite vertical faces thereof slots 56, 57 which receive therein in guided relation the edge portions 16, 17, respectively of the can body being welded. As is clearly illustrated in each of FIGS. 9 and 10, each of the slots 56, 57 has a flared entrance opening 58 both to facilitate the reception of an edge portion of a can body therein and to provide suitable clearance for adjacent portions of the can body while holding the edge portions 16, 17 generally in a flat state.

It is to be particularly noted from a comparison of FIG. 9 with FIG. 10 that when the edge portions 16, 17 of a can body 15 enter the Z-bar 43, the edge portions are overlapped to a greater extent and are greater spaced radially than the same edge portions are when they leave the Z-bar 43. Thus, the Z-bar 43 assures the desired edge guidance of the type to which this invention relates and which is particularly schematically shown in FIG. 11.

It is to be noted that the edge portions 16, 17 will still be radially spaced when they leave the Z-bar 43. This is due to the fact the the Z-bar is of a one-piece construction. This slight spacing, however, is compensated for due to the fact that the end of the Z-bar 43 does not project to the weld point, and thus, the edge portions 16, 17 do have an opportunity to gradually come together between the roller electrodes 21, 22 at the weld point.

Referring once again to FIG. 7, it will be seen that the slot 56 gradually slopes upwardly between the roller electrodes 21, 22 while the slot 57 gradually slopes downwardly between the same roller electrodes. It has been found that generally if the median line (not shown) between the slots 56, 57 is parallel to the horn 24, this is the most desirable arrangement. However, it is feasible to employ shims (not shown) between the Z-bar 43 and both the horn 24 and the support 32 so as to slightly tilt the Z-bar under certain circumstances.

It is also to be noted that the end of the Z-bar 43 approaching the roller electrodes 21, 22 is cut away both on the upper surface and the upper surface thereof with the terminal end of the Z-bar 43 being only of sufficient thickness so as to define the slots 56, 57. In this manner maximum guidance of the can body by the Z-bar 43 is accomplished.

It is also to be understood at this time that the length of the Z-bar 43 is at least as great as the length of a can body being welded so that the can body prior to its initial engagement between the roller electrodes 21, 22 has the edge portions 16, 17 thereof in a fully guided and controlled position prior to the initial welding together thereof.

It is also to be understood that the can body 15, at the time it passes along the Z-bar 43, is under the full control of the hour glass rolls 42 of the guide 41. The control is such that the hour glass rolls 42 are arranged in a slightly conical pattern of increasing diameter from the left to the right, as viewed in FIGS. 1 and 2, and the shaping effect of the hour glass rolls 42 is resisted by the resiliency of the metal from which the can body 15 is formed so that for all practical purposes the Z-bar 43 has little or no effect on the guidance of the can body including the edge portions thereof. The Z-bar 43 solely maintains control over the edge portions as is necessitated by any deficiency of guidance on the part of the guide 41. It is to be understood that this minimal contact between a can body and the Z-bar 43 is highly desirable, if not necessary, in view of the fact that can bodies are formed in accordance with this invention on the order of 600 can bodies per minute and higher and that the raw edges of the can bodies are relatively sharp and would cause undue wearing of the Z-bar 43 is the Z-bar were utilized as the primary edge guidance means.

Reference is now made to FIGS. 12 and 13 wherein a practical embodiment of the guide 41 is illustrated. The bodymaker includes an upper horizontal frame member 60 which is suitably supported relative to the horn 24 and which provides in part means for supporting the endless conveyor 45. The frame member 60 is in the form of a conventional H or I-beam and includes a generally horizontally disposed web 61 having at one end thereof a full flange 62. At the opposite end of the web 62 is a second vertically disposed flange 63 which is slightly offset to one side of the vertical center of the horn 24.

Normally welded or otherwise secured to the lower edge of the flange 63 and in centered relation with respect to the vertical axis of the horn 64 is an elongated mounting bar 64, which, in turn, carries a lower guide 65 for the endless conveyor chain 46 which has been omitted for purposes of clarity.

A portion of the flange 63 in the vicinity of the roller electrodes 21, 22 has been cut away and a special mounting plate 66 has been seated therein and welded in place. This mounting plate 66, which is also suitably welded to the bar 64, is utilized in the mounting of the guide unit 41.

To the left of the mounting plate 66, as viewed in FIG. 13, there is provided a relatively fixed spacer 67 which is secured in place by bolts 68 which pass through the mounting plate 66 and are threaded into a thinner spacer 70 disposed on the right hand side of the mounting plate 66. A support plate 71 is secured to the mounting plate 66, but spaced therefrom by the spacer 67, by means of an upper pair of bolts 72 which are threaded into the mounting plate 66, and a lower pair of bolts 73, which are also threaded into the mounting plate 66, but pass therethrough and through the spacer 70. The support 71 is accurately positioned by means of a key 74 positioned between the support 71 and the spacer 67. A second and similar support 75 is secured in place by the bolts 73 through nuts 76 with the support 75 being positioned by means of a key 77 disposed between the support 75 and the spacer 70.

The aforementioned hour glass rolls 42 are carried by the supports 71 and 75 in the staggered relationship specifically illustrated in FIGS. 1, 2 and 12. The hour glass rolls 42 are specifically positioned to accurately control the shape and path of movement of the can body 15 being welded. Each hour glass roll 42 is positioned within a suitable recess 80 formed in the respective one of the supports 71, 7 and is carried by a headed bolt 81 which has an end portion thereof threaded into the respective support. If desired, suitable thrust washers 82 may be carried by the bolt 81 on each side of the associated hour glass roll 42 to facilitate the rotation thereof.

Each hour glass roll 42 is adjustably positioned through the accurate positioning of the associated bolt 81. It is to be noted that the non-headed end of each bolt 81 is provided with a slot or socket 83 which facilitates the rotation thereof after the guide 41 has been assembled so as to permit the final adjustment of each hour glass roll 42. After the final adjustment is achieved, each bolt 81 is locked in place by means of a set screw 84. In this manner, the path of movement of the can bodies 15 being welded may be adjusted to assure that there is no undue frictional engagement of the can bodies with the Z-bar 43.

It is also pointed out at this time that the lower roller electrode 22, which is pressure urged upwardly, is carried by and driven through an arm 85 which is pivotally mounted as at 86. The mounting of the lower roller electrode 22 in no way forms a part of this invention and the above description is merely for the purpose of fully disclosing the invention.

Referring now to FIGS. 14 through 18, it will be seen that there are illustrated the details of the modified form of external guide sleeve, which guide sleeve is generally identified by the numeral 90. For assembly purposes, the guide sleeve 90 is preferably formed in two halves 91, 92 which are releaseably secured together by suitable fasteners 93.

The guide sleeve 90 has an internal guide surface 94 of a changing cross section, the surface 94 being of a generally oval configuration at the entrance end of the guide sleeve and a substantially circular cross section at the exit end of the guide sleeve. With particular reference to FIG. 17, it will be seen that the cross section of the surface 94 at the entrance end of the guide sleeve 90 is transversely foreshortened and the surface 94 is defined by two arcs having like radius R with the center of each arc being transversely offset from the center of the surface 94 by a distance X. The distance X is actually a very small distance. For example, in a typical installation where the diameter of the substantially circular configuration at the exit end of FIG. 18 is 2.592 inches, the offset X may be .005 inch and the radius R may be 1.296 inch.

With particular reference to FIG. 15, it will be seen that the guide sleeve 90 has an intermediate portion in the welding area. In order to accommodate the external roller electrode 22, the lower portion of the guide sleeve 90 is provided with a cut out 95.

It is to be noted that the Z-bar 43 projects through the leading portion of the guide sleeve 90 and projects slightly into the cut out 95. In order to facilitate mounting of the Z-bar 43, the leading portion of the guide sleeve 90 is provided with a socket 96 receiving the Z-bar 43, as is best shown in FIG. 16.

From the foregoing, it is to be understood that the welding assembly includes an elongated frame member 60. In order to facilitate the mounting of the guide sleeve 90, there is secured to one side of the frame member 60 a mounting block 97 by means of fasteners 98. In turn, there is secured to the mounting block 97 a support 100 of the hanger type which is secured to the mounting block by means of suitable fasteners 100 and to the guide sleeve member 92 by means of fasteners 102. While the support 100 may prove to be sufficient, if desired, a further support 103 of the hanger type may be suitable secured to the flange 63 of the frame member 60 and anchored to the guide member 91 by means of fasteners 104.

It is to be understood that the horn 24 passes through the guide sleeve 90 and overlying the guide sleeve 90 is the usual lower guide 65 for the previously described endless conveyor chain 46, which chain has been omitted from FIGS. 14 through 16 for purposes of clarity.

It is to be understood that a can body blank will be shaped to the general cylindrical configuration about the horn 24 and then fed longitudinally of the horn 24 into engagement with the Z-bar 43 in the manner described above. When the generally cylindrical can body blank is received in the guide sleeve 90, it is shaped to an oval cross section in the manner defined with respect to FIG. 17, with the result that the overlapped edges thereof are retained within the slots of the Z-bar 43 in the desired manner with a minimum of frictional engagement therewith. As the can body blank is moved through the guide shoe, the cross section thereof will progressively change from the generally oval cross section to the substantially cylindrical cross section at the welding point between the roller electrodes 21, 22 with the resultant decreasing of the overlap of the unseamed edges. At the welding area, and immediately therebeyond, the guide sleeve 90 retains the substantially cylindrical shape of the welded can body 15 and thus serves to provide for a constant control over the can body during the welding operation. It has been found that this external control on the shape of the can body blank, together with the control afforded by the horn 24 provides for a minimum pressure contact between the unseamed edges of the can body blank and the Z-bar 43.

Although the invention is particularly directed to the forming of a single can body, the invention is not so limited and therefore, in the appended claims broader terms are utilized. The term "short lengths of tubing" is intended to identify tubing having a length on the order of 12 inches or less and no greater than 24 inches while the term "thin walled tubing" is intended to cover tubing having a thickness generally on the order of 0.008 inch and ranging between 0.002 inch and 0.025 inch.

Although only a preferred embodiment of the invention has been specifically illustrated and described herein, it is to be understood that minor variations may be made in the bodymaker construction and the operation thereof without departing from the spirit and scope of the invention, as defined by the appended claims.

We claim:

1. A method of progressively welding a short length of thin walled tubing having a leading edge, a trailing edge and side edges; said method comprising the steps of bringing the side edges of the unseamed tubing through the length of the tubing into overlapped relation with the amount of overlap increasing from the leading edge of the tubing to the trailing edge of the tubing, and feeding the so-formed unseamed tubing through welding apparatus leading edge first and progressively welding the overlapped edges while progressively decreasing the amount of overlap.

2. The method of claim 1 wherein said overlapped side edges are radially spaced prior to said feeding of the unseamed tubing.

3. The method of claim 1 wherein said overlapped side edges are radially spaced prior to said feeding of the unseamed tubing with said radial spacing gradually decreasing between said trailing edge and said leading edge.

4. The method of claim 1 wherein said overlapped side edges are radially spaced prior to said feeding of the unseamed tubing with said radial spacing gradually decreasing between said trailing edge and said leading edge and coming into contact generally at the welding apparatus.

5. The method of claim 2 wherein the welding is of the electrical heating type and welding occurs between a pair of opposed rolls.

6. The method of claim 1 wherein the welding is of the electrical resistance heating type utilizing roller electrodes.

7. A method of forming a short length of thin wall tubing comprising the steps of providing a blank, forming the blank generally into an open seam cylinder having a leading edge and a trailing edge and with free opposing edges in circumferentially spaced relation, progressively reducing the diameter of the cylinder while guiding said free edges into overlapped relation, then progressively diminishing the overlap to a predetermined lap starting at the leading edge of the cylinder, and thereafter progressively welding together the lapped edges.

8. The method of claim 7 wherein the cylinder is externally and internally guided.

9. The method of claim 7 wherein the cylinder is externally guided in changing the section thereof and the free edges are guided to maintain orientation of the cylinder.

10. The method of claim 9 wherein the welding is of the electrical resistance heating type utilizing roller electrodes.

11. The method of claim 1 wherein said unseamed tubing with the side edges thereof in overlapping relation is shaped to an oval cross section and then brought to a circular cross section when the overlapping of the overlapped side edges is reduced and the overlapped side edges are welded together.

12. The method of claim 1 wherein said unseamed tubing with the side edges thereof in overlapping relation is shaped to an oval cross section having a major axis passing said overlapped edges and then brought to a circular cross section when the overlapping of the overlapped side edges is reduced and the overlapped side edges are welded together.

\* \* \* \* \*

UNITED STATES PATENT OFFICE
CERTIFICATE OF CORRECTION

Patent No. 3,834,010      Dated September 10, 1974

Inventor(s) Robert W. Wolfe and Richard E. Carlson

It is certified that error appears in the above-identified patent and that said Letters Patent are hereby corrected as shown below:

On the Abstract Page, before the line "Filed: Sept. 19, 1972" insert the following -- Assignee: CONTINENTAL CAN COMPANY, INC., New York, N. Y.

Signed and Sealed this thirtieth Day of September 1975

[SEAL]

Attest:

RUTH C. MASON
*Attesting Officer*

C. MARSHALL DANN
*Commissioner of Patents and Trademarks*